(12) United States Patent
Ghannam et al.

(10) Patent No.: US 11,230,203 B2
(45) Date of Patent: Jan. 25, 2022

(54) SELECTIVE ILLUMINATION OF CHARGING PORT STATUS INDICATORS FOR AN ELECTRIFIED VEHICLE

(71) Applicant: Ford Global Technologies, LLC, Dearborn, MI (US)

(72) Inventors: Lila Ghannam, Northville, MI (US); Matt DeDona, Northville, MI (US); Jered Dziadosz, Novi, MI (US); Toussaint Carpenter, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 106 days.

(21) Appl. No.: 16/776,582

(22) Filed: Jan. 30, 2020

(65) Prior Publication Data

US 2021/0237608 A1 Aug. 5, 2021

(51) Int. Cl.
*B60L 53/66* (2019.01)
*B60L 53/31* (2019.01)
*B60L 53/18* (2019.01)
*B60Q 1/50* (2006.01)

(52) U.S. Cl.
CPC ............... *B60L 53/66* (2019.02); *B60L 53/18* (2019.02); *B60L 53/31* (2019.02); *B60Q 1/50* (2013.01); *B60L 2250/16* (2013.01)

(58) Field of Classification Search
CPC ...................................................... B60L 53/66
USPC ........................................................ 320/109
See application file for complete search history.

(56) References Cited

U.S. PATENT DOCUMENTS

| 5,757,595 | A | * | 5/1998 | Ozawa | B60L 53/16 340/636.1 |
| 8,487,752 | B2 | * | 7/2013 | Stillfried | B60Q 1/50 340/425.5 |
| 10,513,197 | B1 | * | 12/2019 | Carpenter | B60L 53/60 |
| 2009/0021364 | A1 | * | 1/2009 | Frey | B60Q 1/50 340/468 |
| 2009/0242291 | A1 | * | 10/2009 | Sagawa | B60L 53/65 180/65.265 |
| 2010/0246198 | A1 | * | 9/2010 | Hook | B60L 53/16 362/459 |
| 2011/0043355 | A1 | * | 2/2011 | Chander | B60K 15/05 340/455 |
| 2012/0218779 | A1 | * | 8/2012 | Sawayanagi | B60L 53/16 362/613 |
| 2016/0089981 | A1 | * | 3/2016 | Kodawara | B60L 50/40 307/10.1 |

(Continued)

FOREIGN PATENT DOCUMENTS

| CN | 204068379 U | 12/2014 |
| CN | 105098916 A | 11/2015 |
| CN | 105515114 A | 4/2016 |

*Primary Examiner* — Jerry D Robbins
(74) *Attorney, Agent, or Firm* — David B. Kelley; Carlson, Gaskey & Olds, P.C.

(57) ABSTRACT

This disclosure relates to selective illumination of charging port status indicators for an electrified vehicle. An example electrified vehicle includes a charging port configured to couple to a plug, a charging port status indicator configured to selectively illuminate to indicate a charging status of the charging port, and a controller configured to instruct the charging port status indicator to illuminate when data is transmitted via the charging port. A method is also disclosed.

20 Claims, 3 Drawing Sheets

(56) References Cited

U.S. PATENT DOCUMENTS

2017/0197516 A1\* 7/2017 Yamazaki ............ B60L 11/1818
2017/0259785 A1\* 9/2017 Lovett ................. B60R 25/2018
2017/0267117 A1\* 9/2017 Grider .................... B60L 53/14

\* cited by examiner

SELECTIVE ILLUMINATION OF CHARGING PORT STATUS INDICATORS FOR AN ELECTRIFIED VEHICLE

TECHNICAL FIELD

This disclosure relates to selective illumination of charging port status indicators for an electrified vehicle.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

The traction battery is a relatively high-voltage battery that selectively powers the electric machines and other electrical loads of the electrified vehicle. The traction battery of a plug-in electrified vehicle may be charged at public or private electrified vehicle charging stations, for example. Plug-in electrified vehicles include a charging port configured to couple to a plug of the electrified vehicle charging station. When the plug is coupled to the charging port, the electrified vehicle charging station may charge the traction battery.

SUMMARY

An electrified vehicle according to an exemplary aspect of the present disclosure includes, among other things, a charging port configured to couple to a plug, a charging port status indicator configured to selectively illuminate to indicate a charging status of the charging port, and a controller configured to instruct the charging port status indicator to illuminate when data is transmitted via the charging port.

In a further non-limiting embodiment of the foregoing electrified vehicle, the charging port is a first charging port configured to couple to a first plug, and the electrified vehicle further comprises a second charging port configured to couple to a second plug.

In a further non-limiting embodiment of any of the foregoing electrified vehicles, the charging port status indicator is a first charging port status indicator, and the electrified vehicle further comprises a second charging port status indicator configured to selectively illuminate to indicate a charging status of the second charging port.

In a further non-limiting embodiment of any of the foregoing electrified vehicles, the controller is configured to instruct a respective one of the first and second charging port status indicators to illuminate when data is transmitted via one of the first and second charging ports.

In a further non-limiting embodiment of any of the foregoing electrified vehicles, the controller is configured to instruct both of the first and second charging port status indicators to illuminate when data is transmitted via either the first or second charging port.

In a further non-limiting embodiment of any of the foregoing electrified vehicles, the electrified vehicle includes a first charging port door configured to selectively open to expose the first charging port and close to cover the first charging port, and further includes a second charging port door configured to selectively open to expose the second charging port and close to cover the second charging port. Further, the controller is configured to only instruct the first and second charging port status indicators to illuminate when data is transmitted via a respective one of the first and second charging ports and when the respective first and second charging port door is open.

In a further non-limiting embodiment of any of the foregoing electrified vehicles, the first and second charging port status indicators are arranged either inside or outside a respective one of the first and second charging port doors relative to when the respective one of the first and second charging port doors are closed.

In a further non-limiting embodiment of any of the foregoing electrified vehicles, the first charging port is one of an alternating current (AC) charging port and a direct current (DC) charging port, and the second charging port is the other of an AC charging port and a DC charging port.

In a further non-limiting embodiment of any of the foregoing electrified vehicles, when data is not transmitted via either the first or second charging port, the controller is configured to determine whether AC charging or DC charging is occurring and to issue instructions to illuminate a respective one of the first and the second charging port status indicators.

In a further non-limiting embodiment of any of the foregoing electrified vehicles, the first and second plugs are plugs of an electrified vehicle charging station.

In a further non-limiting embodiment of any of the foregoing electrified vehicles, the electrified vehicle includes a battery pack configured to output electrical power to an electric machine, and the electric machine is configured to provide rotational output power to drive the electrified vehicle.

In a further non-limiting embodiment of any of the foregoing electrified vehicles, the first charging port is configured to couple the battery pack to the first plug and the second charging port is configured to couple the battery pack to the second plug.

In a further non-limiting embodiment of any of the foregoing electrified vehicles, the electrified vehicle is one of a battery electric vehicle and a plug-in hybrid electric vehicle.

A method according to an exemplary aspect of the present disclosure includes, among other things, illuminating a charging port status indicator associated with a charging port of an electrified vehicle when data is transmitted via the charging port.

In a further non-limiting embodiment of the foregoing method, the charging port is a first charging port configured to couple to a first plug and the electrified vehicle includes a second charging port configured to couple to a second plug different than the first plug.

In a further non-limiting embodiment of any of the foregoing methods, the method includes illuminating a respective one of the first and second charging port status indicators when data is transmitted via one of the first and second charging ports.

In a further non-limiting embodiment of any of the foregoing methods, the method includes illuminating both of the first and second charging port status indicators when data is transmitted via either the first or second charging port.

In a further non-limiting embodiment of any of the foregoing methods, the method includes illuminating the first and second charging port status indicators only when data is transmitted via a respective one of the first and second charging ports and when a charging port door associated with the respective one of the first and second charging ports is open.

In a further non-limiting embodiment of any of the foregoing methods, the first charging port is one of an alternating current (AC) charging port and a direct current (DC) charging port, and the second charging port is the other of an AC charging port and a DC charging port.

In a further non-limiting embodiment of any of the foregoing methods, when data is not transmitted via either the first or second charging port, the method includes determining whether AC charging or DC charging is occurring and illuminating a respective one of the first and the second charging port status indicators.

DETAILED DESCRIPTION

This disclosure relates to selective illumination of charging port status indicators for an electrified vehicle. An example electrified vehicle includes a charging port configured to couple to a plug, a charging port status indicator configured to selectively illuminate to indicate a charging status of the charging port, and a controller configured to instruct the charging port status indicator to illuminate when data is transmitted via the charging port. This disclosure provides relatively prompt feedback to the user regarding the charging status of a vehicle, which reduces user confusion and increases user satisfaction. This disclosure is particularly beneficial in the context of electrified vehicles with multiple charging ports, each of which has a dedicated charging port status indicator. In that context, this disclosure prevents situations where the incorrect charging port status indicator is illuminated and further reduces, if not eliminates, any delay in illuminating the correct charging port status indicator. These and other benefits will be appreciated from the following written description.

Figure 1:
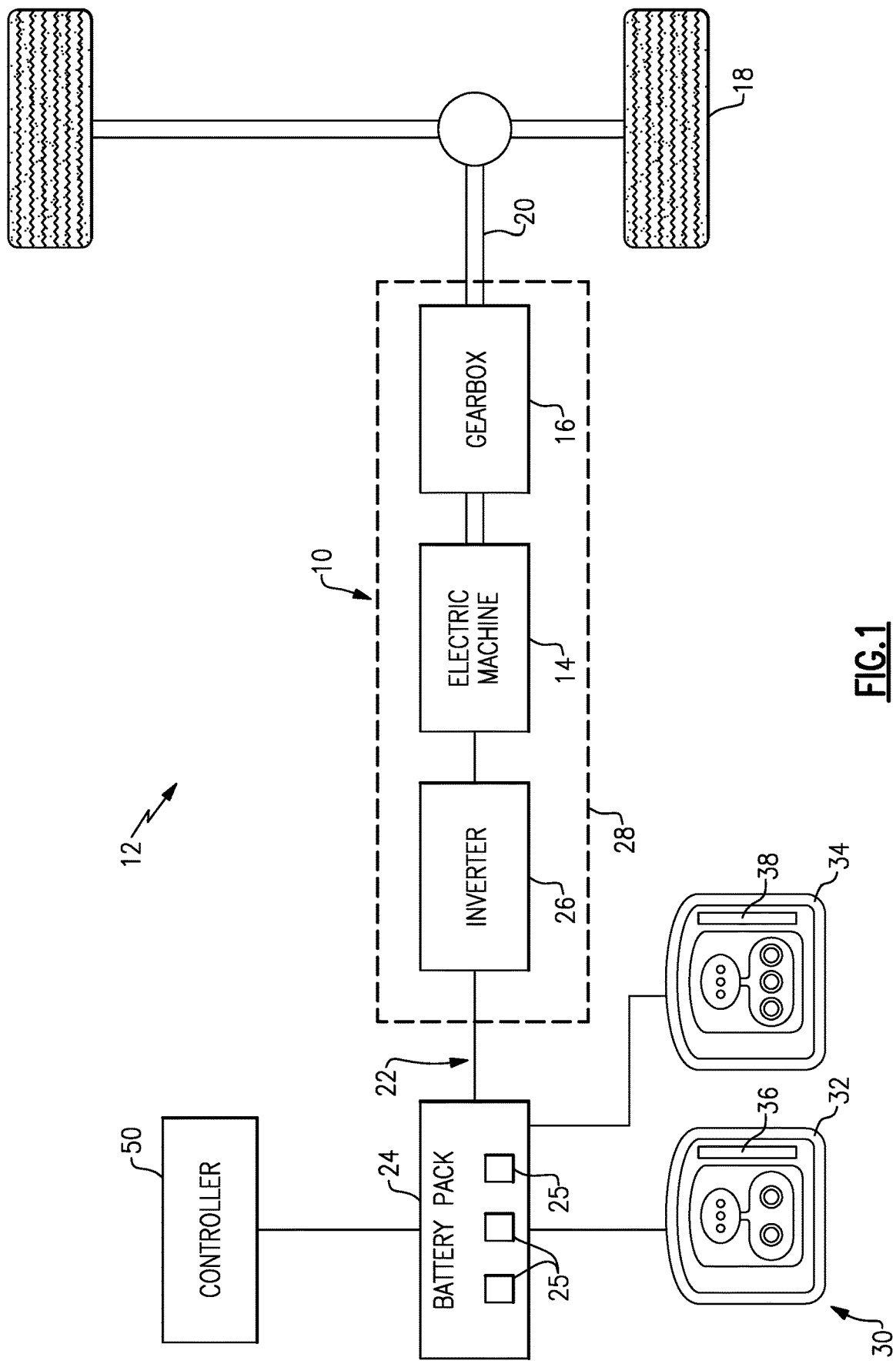
FIG. 1 schematically illustrates various components, including a powertrain, of an electrified vehicle.

FIG. 1 schematically illustrates a powertrain 10 of an electrified vehicle 12.

Although depicted as a battery electric vehicle (BEV), it should be understood that the concepts described herein are not limited to BEVs and could extend to other electrified vehicles, including other plug-in electrified vehicles such as plug-in hybrid electric vehicles (PHEVs). Therefore, although not shown in this embodiment, the electrified vehicle 12 could be equipped with an internal combustion engine that can be employed either alone or in combination with other energy sources to propel the electrified vehicle 12.

In a non-limiting embodiment, the electrified vehicle 12 is a full electric vehicle propelled solely through electric power, such as by an electric machine 14, without any assistance from an internal combustion engine. The electric machine 14 may operate as an electric motor, an electric generator, or both. The electric machine 14 receives electrical power and provides a rotational output power. The electric machine 14 may be connected to a gearbox 16 for adjusting the output torque and speed of the electric machine 14 by a predetermined gear ratio. The gearbox 16 is connected to a set of drive wheels 18 by an output shaft 20. A high voltage bus 22 electrically connects the electric machine 14 to a battery pack 24 through an inverter 26. The electric machine 14, the gearbox 16, and the inverter 26 may collectively be referred to as a transmission 28.

The battery pack 24 is an energy storage device and, in this example, is an exemplary electrified vehicle battery. The battery pack 24 may be a high voltage traction battery pack that includes a plurality of battery assemblies 25 (i.e., battery arrays or groupings of battery cells) capable of outputting electrical power to operate the electric machine 14 and/or other electrical loads of the electrified vehicle 12. Other types of energy storage devices and/or output devices can also be used to electrically power the electrified vehicle 12.

The electrified vehicle 12 may also include a charging system 30 for periodically charging the cells of the battery pack 24. The charging system 30 may be connected to an external power source, such as an electrical grid 64 (FIG. 2), for receiving and distributing power to the cells.

In one non-limiting embodiment, the charging system 30 includes a first interface and a second interface, which in this example are first and second charging ports 32, 34 respectively, and are located on-board the electrified vehicle 12. While this disclosure has benefits in the context of electrified vehicles with multiple charging ports, it should be understood that this disclosure extends to electrified vehicles with one or more charging ports.

The first and second charging ports 32, 34 are adapted to selectively receive power from an external power source, such as from a power cable connected to the external power source, and then distribute the power to the battery pack 24 for charging the cells. One example external power source is an electrified vehicle charging station 60 (FIG. 2), such as a publically available electrified vehicle charging station. In another example, the electrified vehicle charging station is private, such as those at homes or businesses.

The first and second charging ports 32, 34 are configured to couple to plugs associated with an electrified vehicle charging station. In one example, the first charging port 32 is configured to couple to a first type of plug and the second charging port 34 is configured to couple to a second type of plug different than the first type of plug. Specifically, the first and second types of plugs may have a different number and/or arrangement of prongs. In other examples, the first and second charging ports 32, 34 could be configured to couple to the same type of plug.

In one example, the first charging port 32 is of a type that is configured to couple to a plug supplying alternating current (AC) power (i.e., the first charging port 32 is an "AC charging port" and couples to an "AC plug"). In that example, the second charging port 34 is of a type that is configured to couple to a plug supplying direct current (DC) power (i.e., the second charging port 34 is a "DC charging port" and couples to a "DC plug"). Alternatively, the first charging port 32 could be a DC charging port configured to couple to a DC plug, and the second charging port 34 could be an AC charging port configured to couple to an AC plug. In either case, the user has the ability to couple whatever type of plug is available to one of the first or second charging ports 32, 34. In this regard, the charging system 30 may be equipped with power electronics used to convert AC power received from an external power supply to DC power for charging the cells of the battery pack 24. The charging system 30 may also include a DC-to-DC converter in some examples. The charging system 30 may also accommodate one or more conventional voltage sources from the external power supply (e.g., 110 volt, 220 volt, etc.).

In this disclosure, the electrified vehicle 12 includes a charging port status indicator associated with each of the charging ports. In the example of FIG. 1, the electrified vehicle includes a first charging port status indicator 36 configured to selectively illuminate to indicate a charging status of the first charging port 32, and a second charging port status indicator 38 configured to selectively illuminate to indicate a charging status of the second charging port 34. The first and second charging port status indicators 36, 38 each include one or more light emitting diodes (LEDs) in one example. In a particular example, the first and second charging port status indicators 36, 38 are configured to flash to indicate that charging is occurring via a respective one of the first and second charging ports 32, 34. The first and second charging port status indicators 36, 38 may also illuminate in a manner that a user interprets as representative of the state of charge (SOC) of the battery pack 24. For instance, the first and second charging port status indicators 36, 38 may include a series of lights that gradually illuminate as the battery pack 24 charges. The first and second charging port status indicators 36, 38 are capable of illuminating in more than one color in some examples. The first and second charging port status indicators 36, 38 are arranged immediately adjacent the first and second charging ports 32, 34, respectively, in this example. It should be understood that the first and second charging port status indicators 36, 38 could be located elsewhere on the electrified vehicle 12, however.

Figure 3:
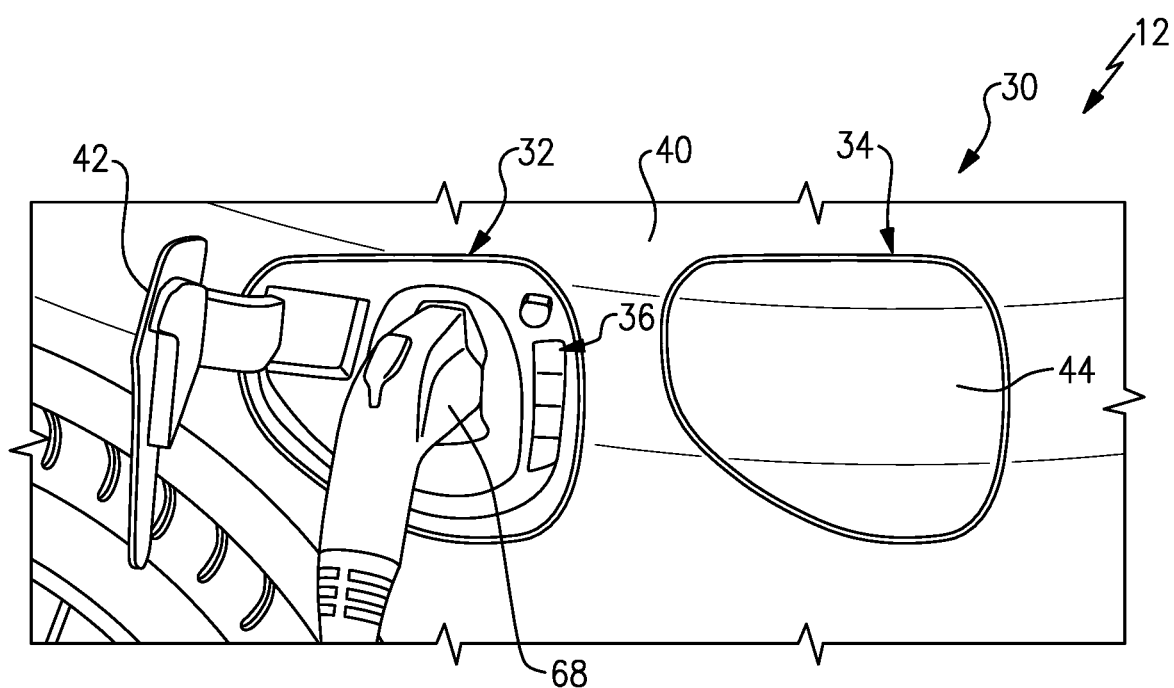
FIG. 3 illustrates a portion of a body of an electrified vehicle.

The electrified vehicle 12 also includes charging port doors associated with the charging ports. FIG. 3 illustrates an example portion 40 of a body of the electrified vehicle 12 adjacent the first and second charging ports 32, 34. In FIG. 3, the first and second charging ports 32, 34 are selectively covered by first and second charging port doors 42, 44, which are configured to selectively open to expose the respective charging port and to close to cover the respective charging port. In FIG. 3, the first charging port door 42 is in the open position and the second charging port door 44 is in the closed position.

In FIG. 3, the first and second charging port doors 42, 44 also selectively cover a respective one of the first and second charging port status indicators 36, 38. For instance, in the configuration of FIG. 3, the first charging port status indicator 36 is visible from an exterior of the electrified vehicle 12 because the first charging port door 42 is open. In this particular example, the first charging port status indicator 36 is illuminated indicating that the electrified vehicle 12 is charging via the first charging port 32. In other examples, the first and second charging port status indicators 36, 38 may be arranged on or adjacent the portion 40 such that they are visible from the exterior of the electrified vehicle 12 even when the first and second charging port doors 42, 44 are closed.

The first and second charging port doors 42, 44 are mounted to the body by a hinge and are configured to pivot between the open and closed positions. This disclosure is not limited to pivoting charging port doors, however, and extends to electrified vehicles with different types of charging port doors. Further, while each charging port has a dedicated charging port door in the embodiment of FIG. 3, there could be a single charging port door selectively covering both of the first and second charging ports 32, 34. In that case, both charging port status indicators 36, 38 would be visible when the single charging port door is open.

With reference back to FIG. 1, the electrified vehicle 12 further includes a controller 50, which may be programmed with executable instructions for interfacing with and operating the various components of the electrified vehicle 12. The controller 50 is configured to receive information from the electrified vehicle 12 and is configured to interpret that information and issue commands to various components of the electrified vehicle 12 based on that information. The controller 50 is shown schematically in FIG. 1. It should be understood that the controller 50 may include hardware and software, and could be part of an overall vehicle control module, such as a body control module (BCM) or vehicle system controller (VSC), or could alternatively be a stand-alone controller separate from the BCM or VSC. Further, the controller 50 may be programmed with executable instructions for interfacing with and operating the various components of the electrified vehicle 12. The controller 50 additionally includes a processing unit and non-transitory memory for executing the various control strategies and modes of the vehicle system.

Figure 2:
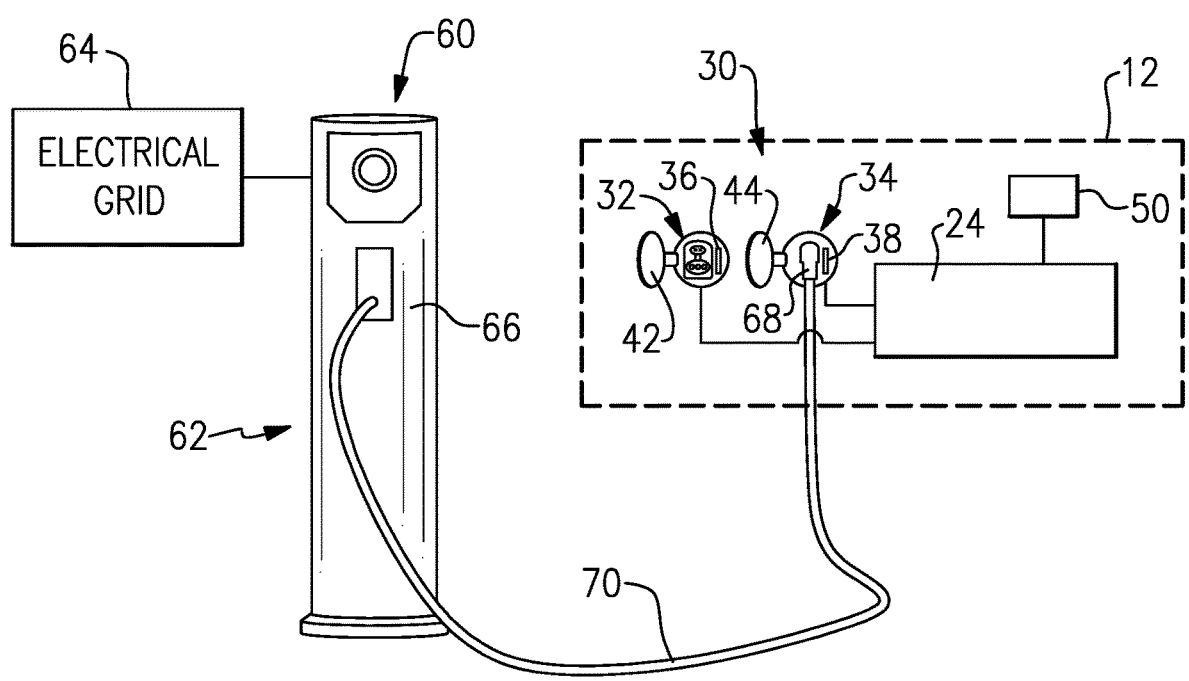
FIG. 2 schematically illustrates an electrified vehicle adjacent an electrified vehicle charging station.

FIG. 2 illustrates an electrified vehicle 12, namely a plug-in electrified vehicle such as a BEV or PHEV, relative to an electrified vehicle charging station 60 ("charging station 60"). The charging station 60 is configured to either directly or indirectly charge the battery pack 24. The charging station 60 includes a tether-type charger assembly 62 and is coupled to an electrical grid 64, which is a grid power source. The charger assembly 62 conveys power from the electrical grid 64 to the electrified vehicle 12. In this example, the charger assembly 62 includes a terminal 66, a plug 68, and charger cable 70 between the terminal 66 and the plug 68. The plug 68 may have a standard plug configuration corresponding to that of either the first charging port 32 or the second charging port 34.

Charging the electrified vehicle 12 using the charging station 60 involves positioning the electrified vehicle 12 near the charging station 60 and electrically coupling the plug 68 to the electrified vehicle 12 via either the first charging port 32 or the second charging port 34. Power can then move from the electrical grid 64 to the electrified vehicle 12, and specifically the battery pack 24. The battery pack 24 can be charged when the electrified vehicle 12 is in a charging position.

The charging station 60 may include AC and/or DC plugs. The plug 68 may indicate what type of current is associated with the plug 68 so that a user may insert it into an appropriate one of the first and second charging ports 32, 34. Likewise, the first and second charging ports 32, 34 may include indicators as to what type of plug is acceptable to plug into the particular charging port. Alternatively, the plug 68 will only fit into one of the first and second charging ports 32, 34, such that it is not possible for a user to plug a DC plug into an AC port, for example. Further, the terminal 66, for example, may be configured to selectively transmit AC or DC power via the plug 68.

The charging station 60 may further be configured to transmit data to or from the electrified vehicle 12 when the plug 68 is coupled to the first and second charging ports 32, 34. Specifically, in one example, when the plug 68 is plugged into one of the first and second charging ports 32, 34, data can be transmitted between the electrified vehicle 12, the charging station 60, and/or the electrical grid 64 without requiring addition pins on the plug 68 or the first and second charging ports 32, 34. In other words, data is transmitted on the same pins that also transmit power.

The controller 50 is configured to determine when data is being transmitted via one or both of the first and second charging ports 32, 34. In other words, the controller 50 is configured to identify whether data is being shared or exchanged via one or both of the first and second charging ports 32, 34. In a particular example, the controller 50 identifies when data is being transmitted via one or both of the first and second charging ports 32, 34 in addition to or as an alternative to the transmission of power. The term data as used in this disclosure refers to digital or electronic data, and does not refer to analog signals.

In this disclosure, the controller 50 is configured to instruct a charging port status indicator to illuminate when data is transmitted via a charging port. In particular, in the example where there are two charging ports 32, 34, the controller 50 is configured to instruct a respective one of the first and second charging port status indicators 36, 38 to illuminate when data is transmitted via one of the first and second charging ports 32, 34.

In the example of FIG. 3, the plug 68 is plugged into the first charging port 32. Thus, the controller 50 detects the transmission of data via the first charging port 32, and, in response, the controller 50 instructs the first charging port status indicator 36 to illuminate. One or more LEDs of the first charging port status indicator 36 may flash, in one example. Illumination of the first charging port status indicator 36 upon the detection of the transmission of data provides nearly instant feedback to the user that charging is occurring and a successful electrical connection has been established between the charging station 60 and the electrified vehicle 12. Accordingly, this disclosure reduces lag time that may otherwise occur when determining the type of current (AC or DC) supplied by the charging station 60. Likewise, in the example of FIG. 2, with the plug 68 plugged into the second charging port 34, the controller 50 would instruct the second charging port status indicator 38 to illuminate.

In a further aspect of this disclosure, the controller 50 is configured to instruct both of the first and second charging port status indicators 36, 38 to illuminate when data is transmitted via either the first or second charging port 32, 34. Illuminating both charging port status indicators 36, 38 avoids user confusion in situations where an incorrect charging port status indicator is illuminated. For instance, in FIG. 2, where both the first and second charging port doors 42, 44 are open, the controller 50 instructs both of the first and second charging port status indicators 36, 38 to illuminate despite the plug 68 being plugged into only the second charging port 34. Both the first and second charging port status indicators 36, 38 may remain illuminated until the controller 50 can verify that the electrified vehicle 12 is indeed charging via the second charging port 34. The controller 50 may verify this by confirming that the charging station 60 is supplying DC power, in one example. Such verification may take a period of time, such as on the order of 10 seconds, and that period of time may be longer than the time it takes the controller 50 to identify whether data is being transmitted via the second charging port 34. Thus, this disclosure reduces user confusion by illuminating both charging port status indicators 36, 38 to provide feedback to the user that the charging station 60 has successfully electrically connected to the electrified vehicle 12. Further, if only one charging port door is open, such as in FIG. 3, the user will not even notice that both charging port status indicators are illuminated for a period of time.

In a further aspect of this disclosure, the controller 50 is configured to only instruct the first and second charging port status indicators 36, 38 to illuminate when data is transmitted via a respective one of the first and second charging ports 32, 34 and when the respective first and second charging port door 42, 44 is open. In other words, when a particular charging port door is closed, the corresponding charging port status indicator will not illuminate. In the example of FIG. 3, for example, the controller 50 will not illuminate the second charging port status indicator 38 (not shown in FIG. 3) because the second charging port door 44 is closed, making it such that the second charging port status indicator 38 is not visible by a user from the exterior of the electrified vehicle 12. In this regard, the controller 50 may be in communication with one or more sensors configured to generate signals indicating whether the first and second charging port doors 42, 44 are open or closed.

In another aspect of this disclosure, when the controller 50 does not detect data being transmitted via the plug 68 or the first or second charging ports 32, 34, the controller 50 is configured to determine whether AC charging or DC charging is occurring, and then issues instructions to illuminate a respective one of the first and the second charging port status indicators 36, 38 upon making such a determination. As indicated above, this aspect of the disclosure may take more time, but when data is not being transmitted via the plug and the charging ports, a short delay may be necessary to confirm that an electrical connection has been made and that AC or DC charging is occurring.

It should be understood that terms such as "about" and "substantially" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. An electrified vehicle, comprising:
   a charging port configured to couple to a plug of an electrified vehicle charging station;
   a charging port status indicator configured to selectively illuminate to indicate a charging status of the charging port; and
   a controller configured to instruct the charging port status indicator to illuminate when data is transmitted between the electrified vehicle charging station and the electrified vehicle via the charging port.

2. The electrified vehicle as recited in claim 1, wherein the charging port is a first charging port configured to couple to a first plug of the electrified vehicle charging station, and the electrified vehicle further comprises a second charging port configured to couple to a second plug of the electrified vehicle charging station.

3. The electrified vehicle as recited in claim 2, wherein the charging port status indicator is a first charging port status indicator, and the electrified vehicle further comprises a second charging port status indicator configured to selectively illuminate to indicate a charging status of the second charging port.

4. The electrified vehicle as recited in claim 3, wherein the controller is configured to instruct a respective one of the first and second charging port status indicators to illuminate when data is transmitted between the electrified vehicle charging station and the electrified vehicle via one of the first and second charging ports.

5. The electrified vehicle as recited in claim 3, wherein the controller is configured to instruct both of the first and second charging port status indicators to illuminate when data is transmitted between the electrified vehicle charging station and the electrified vehicle via only one of the first or second charging port.

6. The electrified vehicle as recited in claim 3, further comprising:
a first charging port door configured to selectively open to expose the first charging port and close to cover the first charging port;
a second charging port door configured to selectively open to expose the second charging port and close to cover the second charging port; and
wherein the controller is configured to only instruct the first and second charging port status indicators to illuminate when data is transmitted between the electrified vehicle charging station and the electrified vehicle via a respective one of the first and second charging ports and when the respective first and second charging port door is open.

7. The electrified vehicle as recited in claim 6, wherein the first and second charging port status indicators are arranged either inside or outside a respective one of the first and second charging port doors relative to when the respective one of the first and second charging port doors are closed.

8. The electrified vehicle as recited in claim 3, wherein the first charging port is one of an alternating current (AC) charging port and a direct current (DC) charging port, and the second charging port is the other of an AC charging port and a DC charging port.

9. The electrified vehicle as recited in claim 8, wherein, when data is not transmitted between the electrified vehicle charging station and the electrified vehicle via either the first or second charging port, the controller is configured to determine whether AC charging or DC charging is occurring and to issue instructions to illuminate a respective one of the first and the second charging port status indicators.

10. The electrified vehicle as recited in claim 2, wherein the electrified vehicle includes a battery pack configured to output electrical power to an electric machine, and the electric machine is configured to provide rotational output power to drive the electrified vehicle.

11. The electrified vehicle as recited in claim 10, wherein the first charging port is configured to couple the battery pack to the first plug and the second charging port is configured to couple the battery pack to the second plug, and the electrified vehicle is one of a battery electric vehicle and a plug-in hybrid electric vehicle.

12. The electrified vehicle as recited in claim 1, wherein the plug includes a plurality of pins and both data and power are transmittable between the electrified vehicle charging station and the electrified vehicle via each of the pins.

13. The electrified vehicle as recited in claim 1, wherein, when the controller configured detects that data is transmitted between the electrified vehicle charging station and the electrified vehicle via the charging port, the controller instructs the charging port status indicator to flash.

14. The electrified vehicle as recited in claim 1, wherein the controller is configured to instruct the charging port status indicator to illuminate when data is transmitted from the electrified vehicle to the electrified vehicle charging station via the charging port.

15. The electrified vehicle as recited in claim 1, wherein the data is one of digital and electronic data and the data is not an analog signal.

16. A method, comprising:
illuminating a charging port status indicator associated with a charging port of an electrified vehicle when data is transmitted between the electrified vehicle and an electrified vehicle charging station via the charging port.

17. The method as recited in claim 16, wherein the charging port is a first charging port configured to couple to a first plug of the electrified vehicle charging station, and the electrified vehicle includes a second charging port configured to couple to a second plug of the electrified vehicle charging station different than the first plug.

18. The method as recited in claim 17, further comprising illuminating a respective one of the first and second charging port status indicators when data is transmitted between the electrified vehicle charging station and the electrified vehicle via one of the first and second charging ports.

19. The method as recited in claim 17, further comprising illuminating both of the first and second charging port status indicators when data is transmitted between the electrified vehicle charging station and the electrified vehicle via only one of the first or second charging port.

20. The method as recited in claim 18, wherein:
the first charging port is one of an alternating current (AC) charging port and a direct current (DC) charging port,
the second charging port is the other of an AC charging port and a DC charging port, and
when data is not transmitted between the electrified vehicle charging station and the electrified vehicle via either the first or second charging port, determining whether AC charging or DC charging is occurring and illuminating a respective one of the first and the second charging port status indicators.

* * * * *